ERNST UMRATH
INVENTOR.

March 15, 1966  E. UMRATH  3,240,428
TIME PROPORTIONING CONTROL SYSTEM
Filed April 26, 1962  8 Sheets-Sheet 3

ERNST UMRATH
INVENTOR.

BY
ATTORNEY

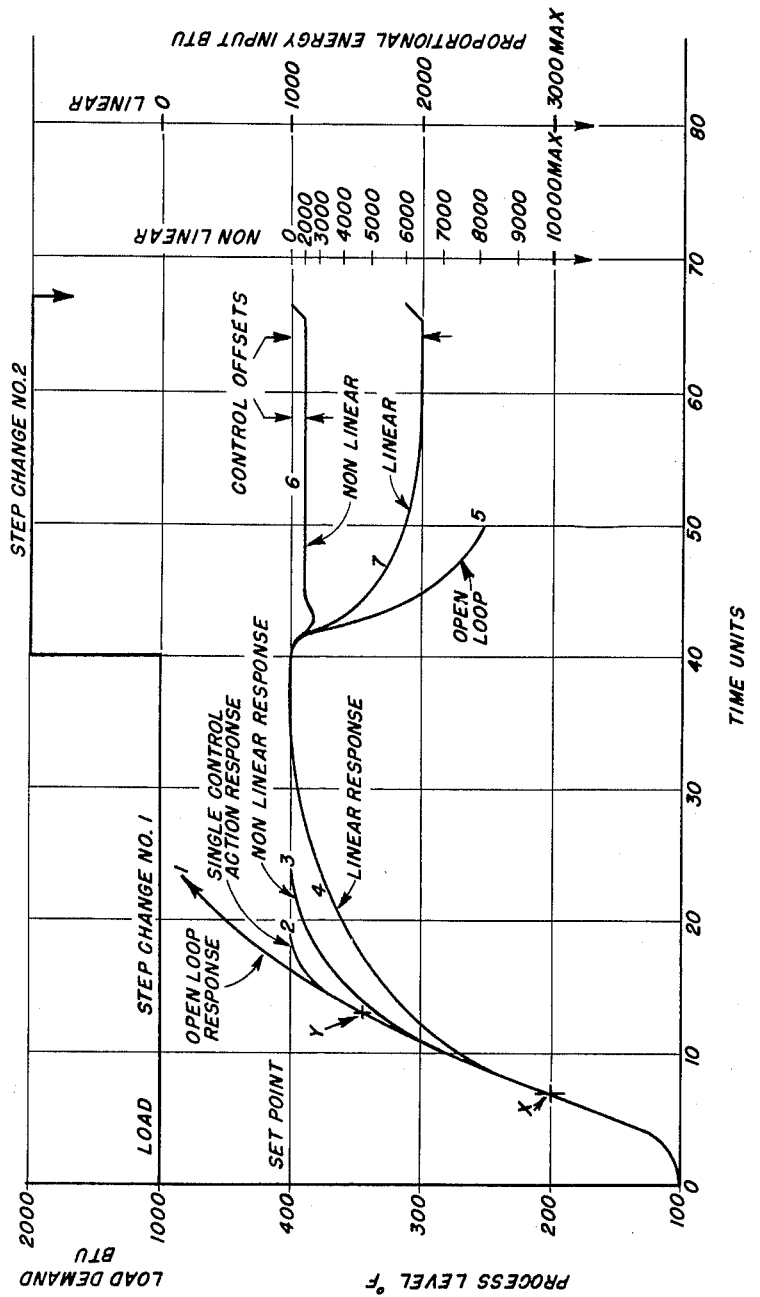

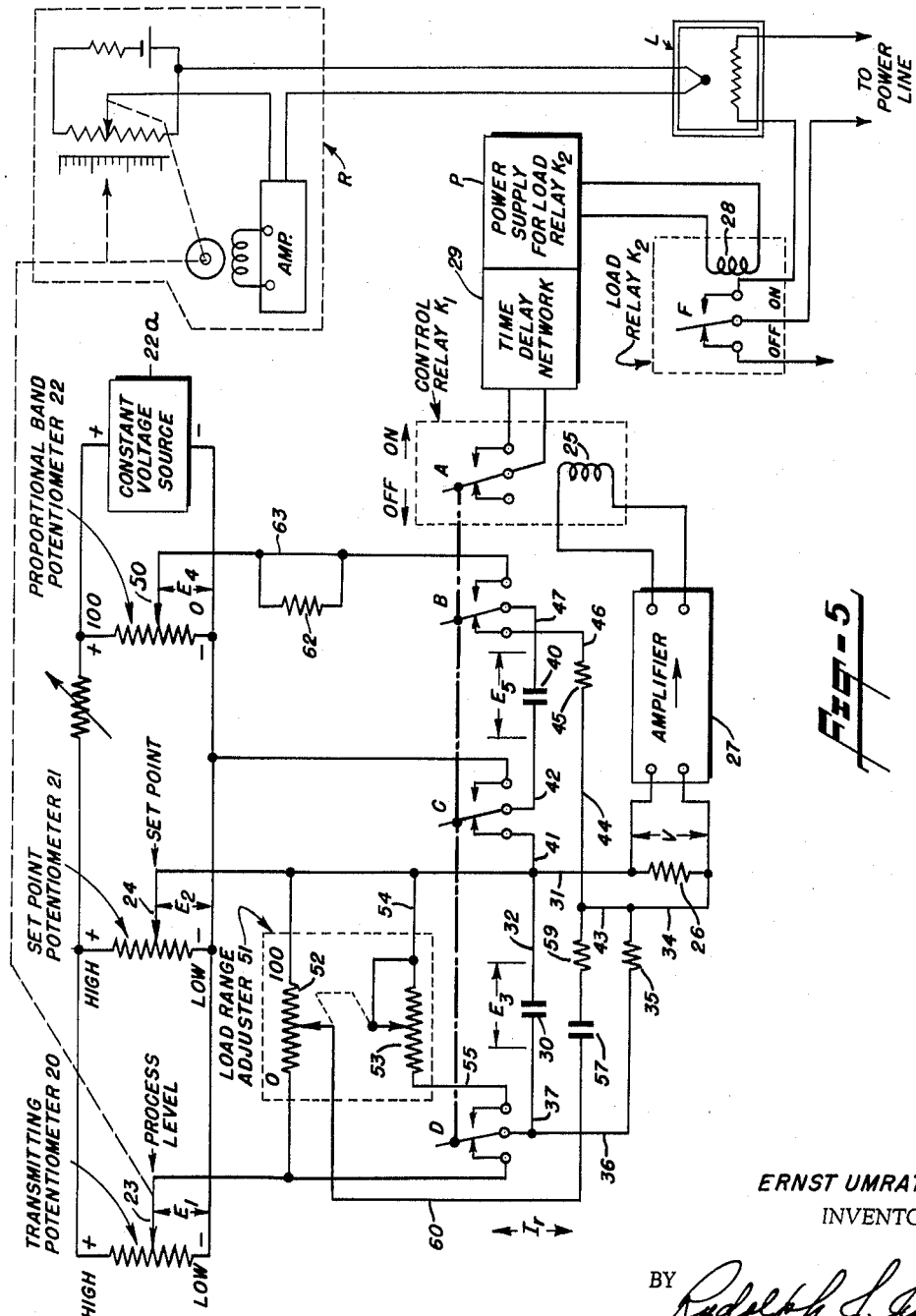

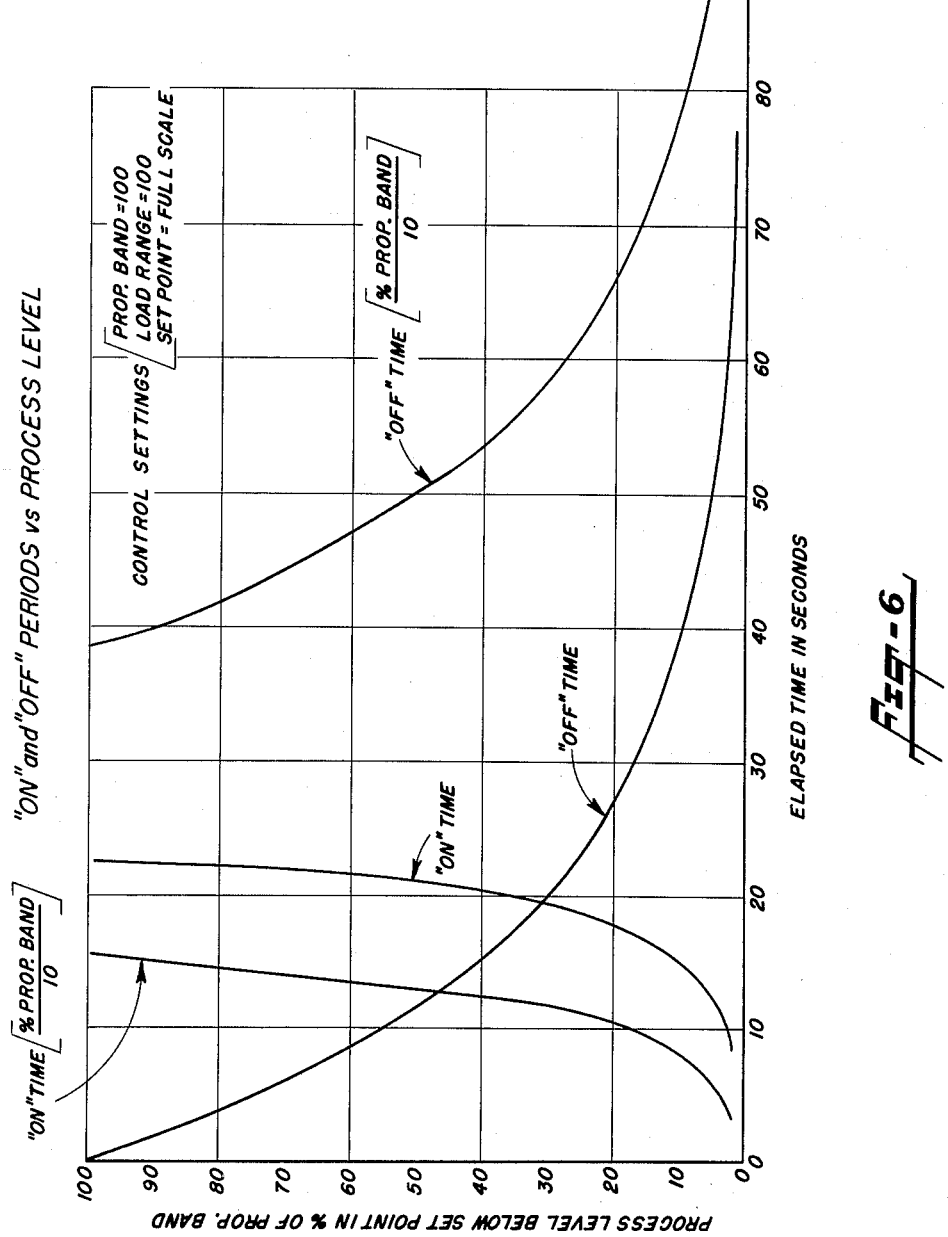

March 15, 1966 E. UMRATH 3,240,428
TIME PROPORTIONING CONTROL SYSTEM
Filed April 26, 1962 8 Sheets-Sheet 7
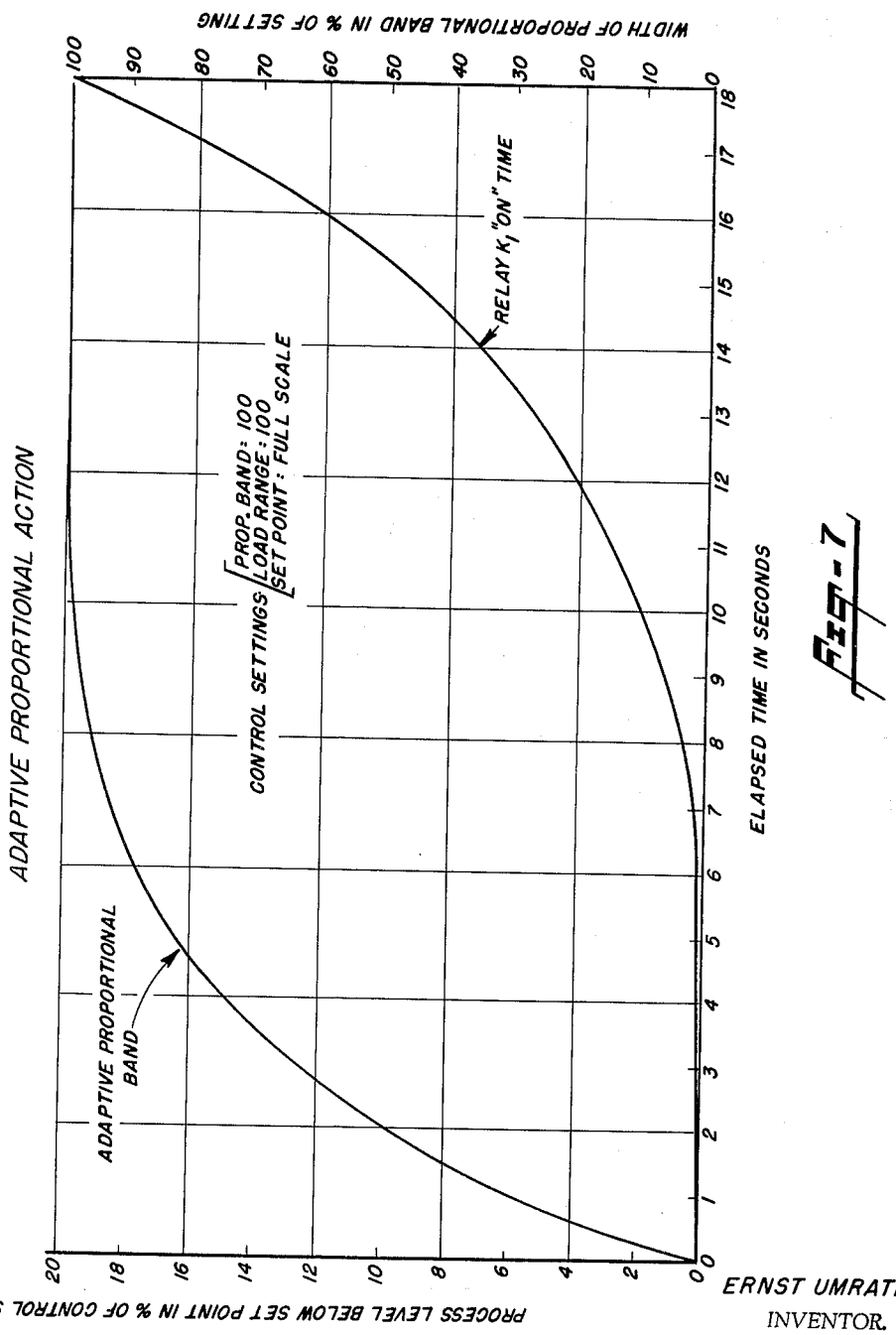
ERNST UMRATH
INVENTOR.

March 15, 1966   E. UMRATH   3,240,428
TIME PROPORTIONING CONTROL SYSTEM
Filed April 26, 1962   8 Sheets-Sheet 8
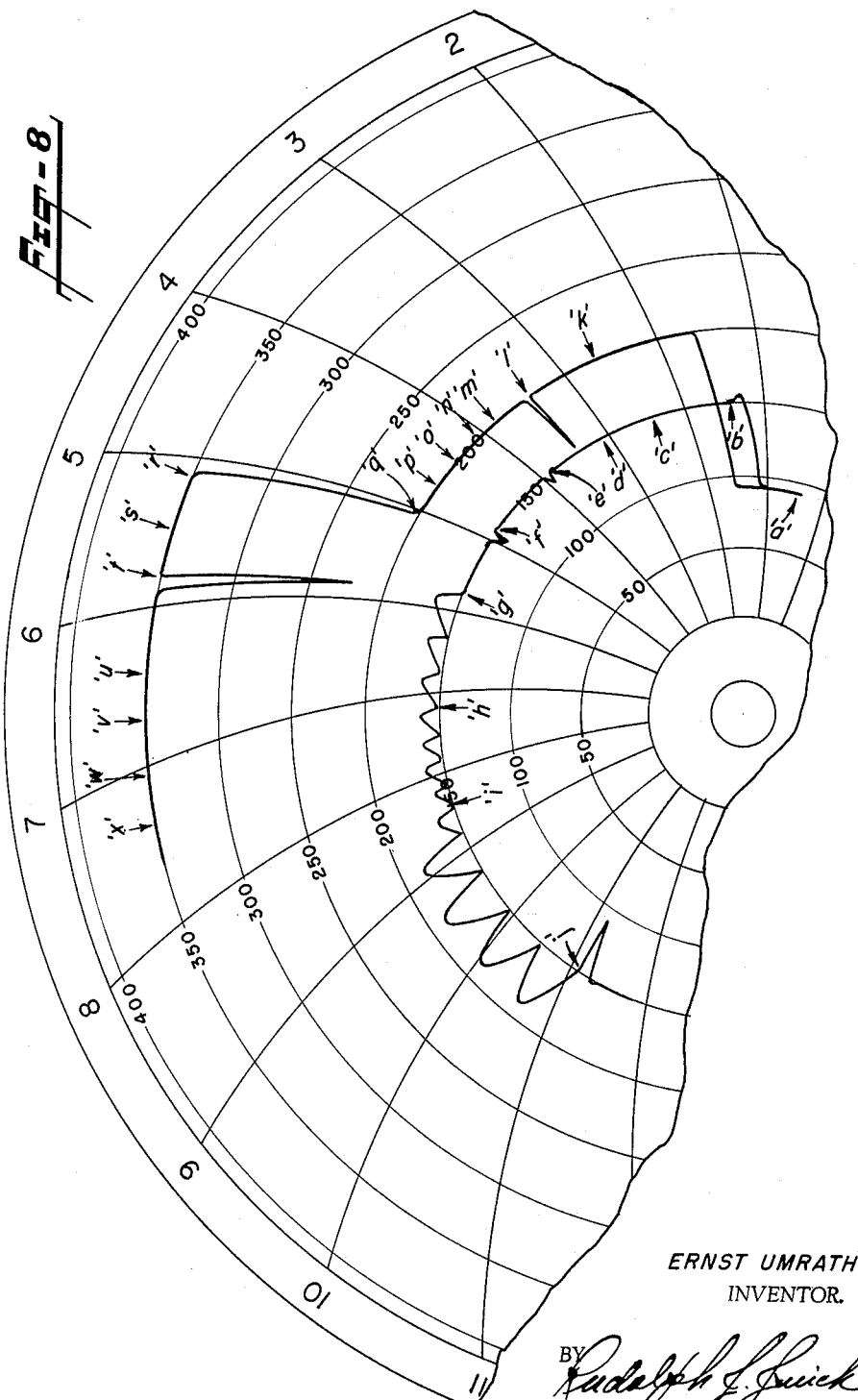
ERNST UMRATH
INVENTOR.
BY Rudolph J. Juick
ATTORNEY United States Patent Office 3,240,428
Patented Mar. 15, 1966

3,240,428
TIME PROPORTIONING CONTROL SYSTEM
Ernst Umrath, North Plainfield, N.J., assignor to Thermo Electric Co., Inc., Saddle Brook, N.J., a corporation of New Jersey
Filed Apr. 26, 1962, Ser. No. 190,461
26 Claims. (Cl. 236—78)

This invention relates to apparatus for maintaining a variable condition at a preselected level and more particularly to a controller for automatically supplying energy to a system thereby to maintain the system at a preset level of temperature.

Although apparatus made in accordance with this invention is adapted for use in any system which is to be maintained at a predetermined condition, it will be described hereinbelow with specific reference to a temperature controller for maintaining an electric furnace at a preset temperature. In a controller of this type, manually settable means are provided for setting the temperature to a desired level in accordance with a required or desired process condition. The actual furnace temperature is measured by a suitable sensing element, such as a thermocouple, and any deviation of the furnace temperature from the preset value results in an appropriate change in the electrical energy supplied to the furnace. In order to effect a rapid reestablishment of system balance with a minimum of overshoot and hunting, controllers of this type conventionally include a proportional control function, automatic reset action and various adjustments to effect integral and derivative control action and to change the ratio of the energy supply and load demand.

In spite of these features, present controllers include numerous practical shortcomings and deficiencies. In general, a controller designed and conditioned for precise temperature control about the set point suffers from system overshoot and hunting upon substantial changes in the furnace load and particularly at start-up of the process. On the other hand, controllers capable of providing rapid start-up conditions do not provide precise temperature control about the set point. In consequence, the adaptation of a particular controller to a particular furnace or process condition requires the services of a highly-skilled, experienced operator, who, by trial and error methods, establishes the proper operational procedure for a given controller-process combination.

A controller made in accordance with this invention is based upon fundamentally different concepts leading to the provision of a temperature controller having practical operating features and characteristics constituting a significant advance in this art. The electrical circuit is of simple, straightforward design providing simplicity of operation, operational stability coupled with a minimum possibility of failure, and automatic start-up action without possibility of excessive overheating of the furnace or runaway action. These highly desirable features are obtained in a controller which effects rapid system rebalancing with load changes with a minimum of system overshoot and no system hunting and which, even under appreciable load variations, maintains the furnace temperature at the preset level with a degree of precision heretofore obtained, if at all, only under laboratory conditions.

An object of this invention is the provision of a novel control system having significantly improved operating characteristics.

An object of this invention is the provision of a control system for maintaining a condition at a predetermined level, which system rapidly re-establishes the predetermined level, upon changes in the condition, with a minimum of overshoot and system hunting.

An object of this invention is the provision of temperature control apparatus of the time-proportional type wherein energy is supplied to a process condition by on-off pulses having a time duration proportional to departure of the process condition from a preset level.

An object of this invention is the provision of a proportional controller wherein the proportional action is non-linear and unidirectional, with respect to the control set point.

An object of this invention is the provision of a temperature controller for maintaining the temperature of a medium at a preset level, which apparatus requires no special adjustment for start-up.

An object of this invention is the provision of a proportional temperature controller wherein the proportional function is effective only when the process temperature is below a preset level and wherein the band width of the proportional function is adjustable.

An object of this invention is the provision of a temperature control system incorporating novel adaptive control functions which automatically become effective upon system unbalance thereby to effect a rebalancing of the system in a minimum time and with minimum system hunting.

An object of this invention is the provision of apparatus for controlling the temperature of a medium at a preset level, which apparatus incorporates a non-linear, unidirectional proportional action and automatic means for effecting the supply of energy to the system in accordance with the rate of change of the controlled medium.

An object of this invention is the provision of a control system for maintaining a variable condition at a preselected level, which system comprises power means for altering the state of the condition, means providing a control signal representing the departure of the condition from the preselected level, sensing means responsive to the control signal and actuating the power means, means overriding the control signal when the deviation between the condition and the said preselected level is a predetermined extent, and means modifying the control signal in accordance with the rate of change of the condition.

These and other objects and advantages will become apparent from the following description when taken with the accompanying drawings. It will be apparent, however, that the drawings are for purposes of illustration and are not to be construed as defining the scope or limits of the invention, reference being had for the latter purpose to the claims appended hereto.

In the drawings wherein like reference characters denote like parts in the several views.

Figure 3:
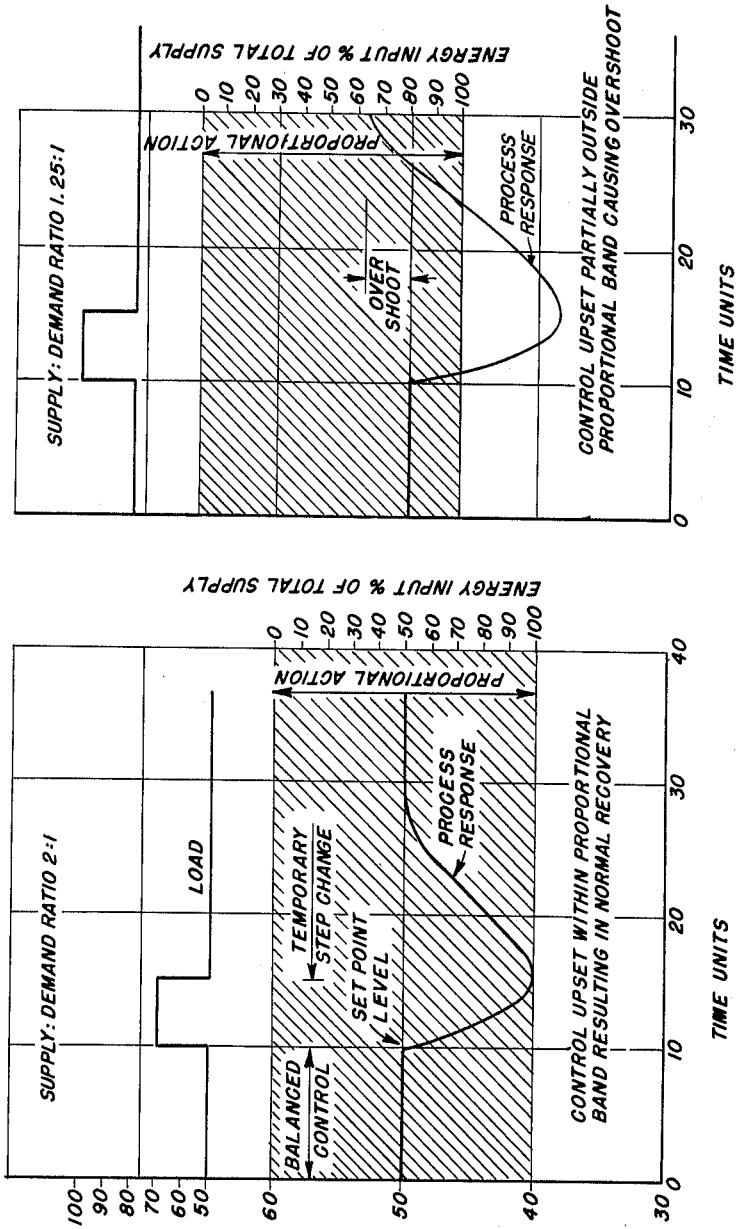

FIGURE 3 includes two related graphs showing the effect of bi-directional proportional action with changes in the energy/supply load demand ratio;

FIGURE 4 is a graph showing the relative actions of linear and non-linear proportional action with step changes in the load demand;

FIGURE 5 is a schematic circuit diagram of apparatus made in accordance with this invention;

FIGURE 6 is a graph showing the control action of the FIGURE 5 apparatus;

FIGURE 7 is a graph showing the effect of adaptive proportional action constituting an important feature of the invention; and FIGURE 8 is a fragmentary view of a recorder chart showing actual control records, under various conditions, obtained in a system using the new controller.

Figure 1:
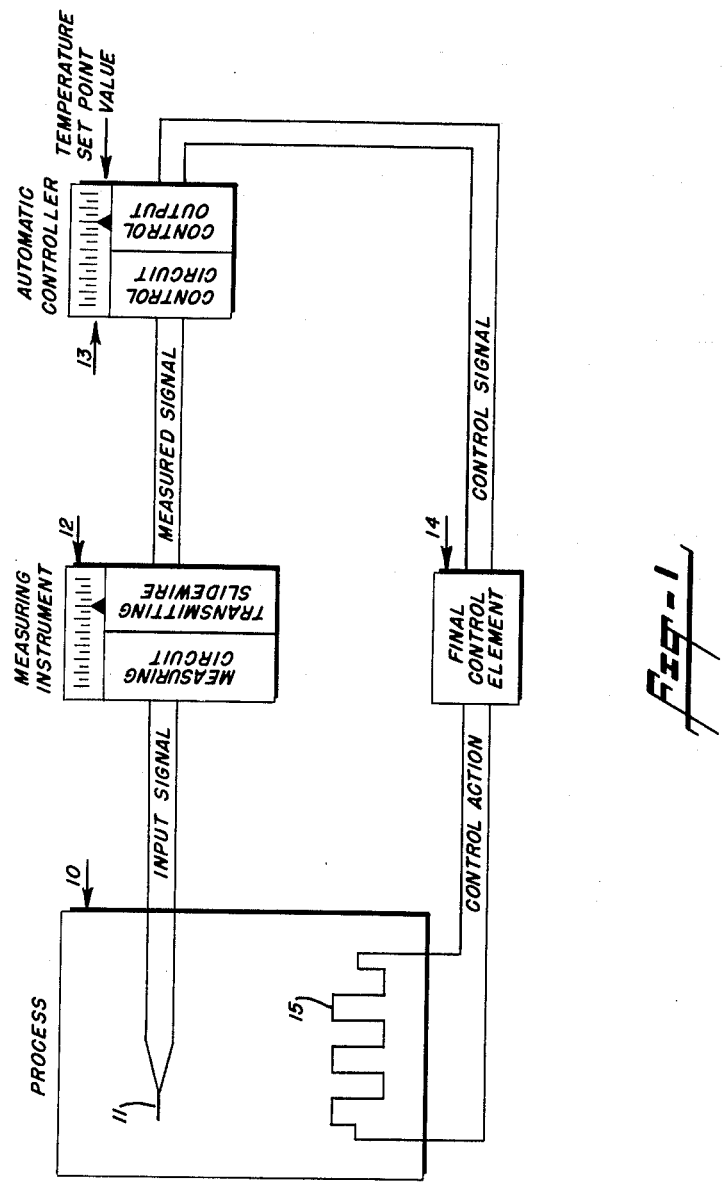
FIGURE 1 is a diagrammatic representation of a control system.

Reference, now, is made to FIGURE 1, which is a diagrammatic representation showing the relationship of essential elements for controlling the temperature within a furnace 10, said furnace being used to maintain a process condition at a preselected temperature. The process condition is sensed continuously by a suitable transducer, such as a thermocouple 11, which develops a voltage signal having a magnitude which varies with the actual temperature within the furnaces. Such voltage signal may be indicated, measured or recorded by a suitable instrument 12 and, at the same time, a representative signal is transmitted to the controller 13 from a transmitting slidewire. In the controller, this signal (measured signal) is compared with a reference voltage whose magnitude depends upon the manual setting of an indicator relative to a scale graduated in values of temperature. When the two voltages are equal, the system is in balance and no corrective action takes place. However, when these voltages are not equal, an error signal, or control signal, is produced, which error signal effects actuation of a final control element. Such final control element may be a contactor or rheostat, in the case of an electric furnace, or an ON-OFF type valve, in the case of a gas or oil fired furnace. In any event, the control element 14 produces a control action which controls the amount of energy supplied to the furnace by a suitable energy source 15, in this case a heater coil, thereby to re-establish a balance condition between the temperature set point of the controller 13 and the process condition as measured by the theromocouple 11.

Various functions and criteria for a control system of this type are recognized by those skilled in this art. In order to facilitate a proper understanding of the invention, these recognized functions and criteria are discussed separately below.

*Proportional action*

The proportional control function automatically supplies heat to the furnace as a function of the measured temperature independently of other associated parameters. The ratio at which energy is supplied to the furnace is proportional to the extent of departure of the process condition from the set point level, being a maximum when the departure is large and a minimum when the departure is small. In a conventional proportional controller, the proportional function is linear, bi-directional in action and the width of the proportional band has no fixed relation to the particular set point of the controller. These factors result in certain inherent disadvantages.

A bi-directional proportional action necessitates an accurate adjustment of the final control element for each and every particular set point and for each load change in order to satisfy the load demand of the particular process. Such adjustment is difficult to determine prior to the start-up of the furnace thereby resulting in wide temperature excursions from the set point, which may be detrimental to the particular process. As a rule, the proper adjustment of the final control element is established by time consuming trial and error methods with due care, based upon experience, to prevent damage to the process. Further, a bi-directional proportional action will tolerate only a relatively narrow proportional band width in order to reduce the excessive temperature deviations from the set point value due to load changes. Such narrow band width, in turn, increases the tendency of sustained or progressively increasing cycling, or hunting of the system following even small control upsets and substantial overshooting upon initial system start-up.

Figure 2:
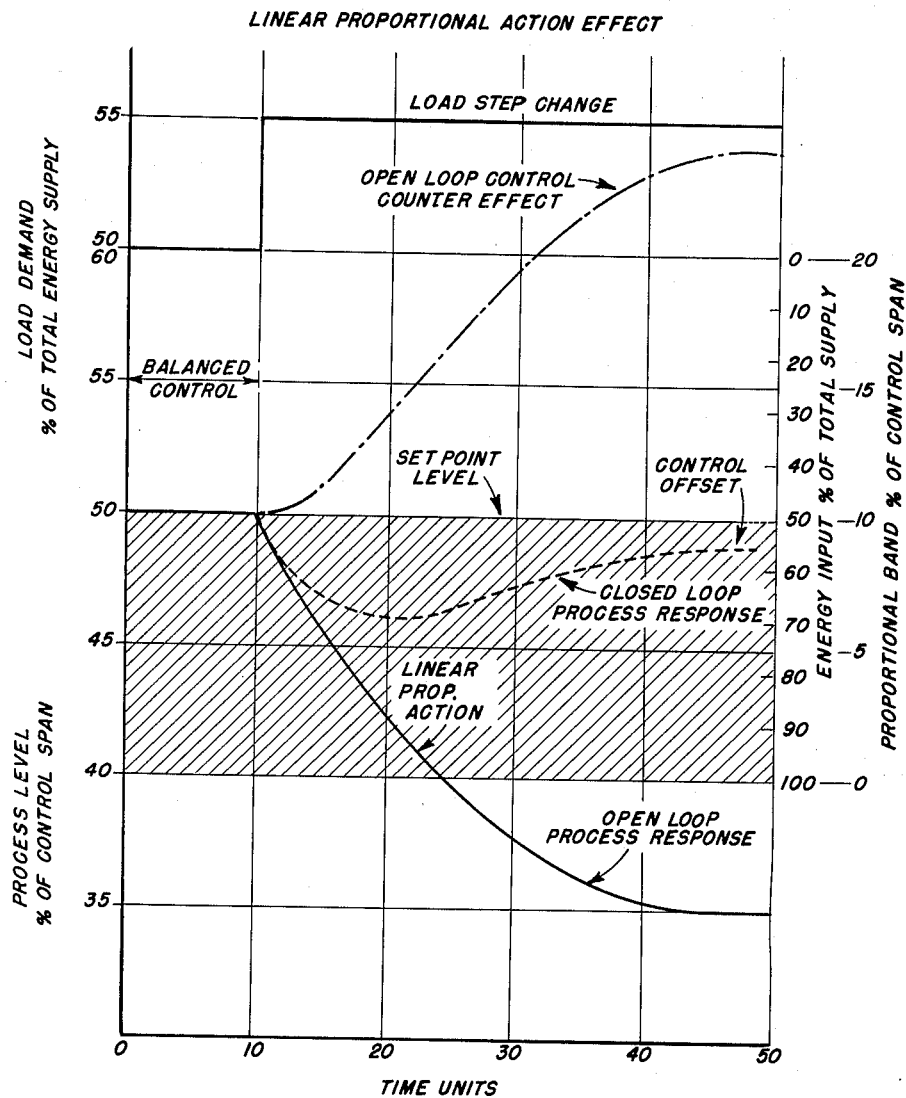
FIGURE 2 is a graph showing the effect of a linear proportional action as a result of a load change.

Also, a linear proportional control action, in response to step-changes in load demand, will not counter-effect the process deviation in the same exponential manner as does the load step change. This will be apparent from a study of FIGURE 2 wherein the system is shown in a balanced condition for time units 0–10 with the load demand during this time period being 50% of the total energy supply available. At time unit 10, a load step change takes place. In order to simplify analysis of a closed loop process response to such change in load, the theoretical "process response" and the corresponding "control counter effect" are shown under assumed open loop operating conditions. It is here pointed out that the open loop "process response" and "control counter effect" curves are qualitative representations. These curves could have any values, depending upon the amount of energy fed into the process upon a unit deviation from the set point. The actual values of these curves is immaterial for purposes of analyses as the shape of the resulting closed loop "process response" curve will not be affected by magnitude. It can be seen that the load step change, due to system lag, will result in an exponential process response. Since the control action is linear with respect to process response, it cannot counter-effect the process response in the same exponential manner as does the load step change. As a result, the braking effect of proportional action, upon the process deviation, is too weak when the process condition departs from the set point and too strong when the process condition approaches the set point. The former effect permits wide process condition deviations whereas the latter effect prevents rapid recovery of the system from a temporary upset.

The extent of the proportional action for process deviations below and above the set point varies directly with the ratio of the prevailing energy supplied to the load demand. If this ratio is low, the set point will fall near the start of the proportional band and the extent of the proportional action for deviations below the set point will be small. The system's inability to cope with normal process upsets, under such conditions, is illustrated in the graphs of FIGURE 3. In the left graphs, a temporary process upset has taken place between time units 10 and 15 and the width of the proportional band is indicated by the cross hatching. With a supply to demand ratio of 2 : 1, the control upset falls within the proportional band resulting in a normal recovery (rebalancing of the system at the set point level) at time unit 30. Specifically, the input energy is controlled over the entire extent and duration of the upset. However, and as is shown in the right graphs, when the supply to demand ratio is 1.25 to 1, with all other conditions being constant, the control upset falls outside of the proportional band whereby the system overshoots. In this case, the input energy is increased to its maximum value only shortly after the load change occurs, thereby permitting a faster and greater extent of deviation. Although the recovery rate is slower than in the first case, the input remains uncontrolled during most of the deviation return to the set point (whereas is should be proportionally reduced), thereby accumulating excess inertia which cannot be absorbed by the relatively brief proportional control action shortly before the set point is reached. This results in overshoot. Inasmuch as the supply to demand ratio cannot be predicted with practical means, control failure due to such conditions is unpredictable.

The combined effects of the above-cited function characteristics makes the selection of a proper proportional band width very difficult to establish. Pure mathematical or graphical approaches, to solve this problem, involve difficult to obtain information of the particular process characteristics and highly specialized personnel capable of evaluating such information. Either method, at best, provides a means of approximation only. Thus, generally, a trial and error approach in the field is preferred as it is less complex and, in the final analysis, may yield optimum values.

It is known that the optimum value of the proportional band is considered to be one which results in a decay ratio of ¼, which, by necessity, includes several cyclic overshoots. Also, it is known that the proportional band selected will operate satisfactorily only over a very narrow band of process variations.

*Reset Action*

Since a system with proportional action only has inherent unpredictable characteristics with respect to the control function in response to control offsets with load demand changes, such system will not satisfy most industrial processes where such changes are unavoidable. In order to eliminate the detrimental offset effect, an automatic reset action must be added. As control offset takes place, the reset function will compensate for the new load demand requirements by adding repetitively to the corrective proportional function by a predetermined amount per unit of time as long as the condition of offset exists. Thus, eventually the final control device will be reset (that is, the set point opening re-adjusted, to satisfy the new load demand). The proper amount of repetitive additional corrective action per unit of time depends upon several process conditions, namely, the actual change in load or set point demand, the magnitude of the initial offset, the velocity-capacity lags of the process and the width of the proportional band as referred to the set point. It is apparent, then, that a proper reset adjustment is very difficult to obtain in view of the numerous dependent process characteristics and control functions.

An even more detrimental aspect of this control function lies in its inherently unstable character, due to its 90 degree phase lag with respect to the offset trend. It is this latter characteristic, in particular, which makes automatic reset a hazardous, though necessary, control function. In most practical applications of industrial process control, where substantial velocity distance lags are unavoidable, even a slight deviation from an ideal reset adjustment will cause irregular cycling and eventually may result in hunting of the system. It will be noted that a proper reset adjustment yielding a decay ratio of ¼ is limited to a very narrow band of operating conditions, although, theoretically, the reset function appears to be beneficial regardless of its setting. Also, because of the manual re-adjustments required for almost any change in the process conditions, the term automatic reset is rather misleading.

As a result of the necessary imposition of automatic reset action upon the primary proportional action of the control system, the limited flexibility and adaptability of the latter function to variable process requirements is further reduced due to the critical interdependence between the two. The basically stable proportional action can no longer be adjusted in an approximate manner, more or less by feel, as it can be in the absence of automatic reset, without risking more than just initial overshoot or unduly long creeping-in of the process condition to the preset level. Any deviation from an ideal proportional band now will critically effect the reset function and, thus, the overall control behavior of the system. Also, whereas without automatic reset, the process, record is rather clearly indicative of the type of re-adjustment to be made, such an identification is no longer apparent with the interacting effect of automatic reset. The relatively narrow band of variable operating conditions within which a fixed combination of the two adjustments will perform satisfactorily necessitates a number of different adjustment combinations for various process deviations from such a band, such as process start-up, load removal and replacement, substantial load and set point changes, etc. Inasmuch as the required adjustment combinations can, as a rule, only be found by time consuming trial and error methods, sometimes hazardous to the process, the practical usefulness of such a controller is impaired.

*Rate Action*

As pointed out hereinabove, the optimum approach to satisfactory operation for any fixed setting of the proportional band (or combination of proportional band plus reset in particular) is limited to a relatively narrow range of operating conditions. This range becomes narrower and more critical to adjust when a relatively wider proportional band must be used, in view of the prevailing characteristics of a particular process. It is for this reason that control adjustments are made with emphasis upon the optimum control of normal system upsets after the process has reached a steady state condition at the control set point, which permits the use of the smallest possible proportional band and the greatest reset value. Such settings, of course, will not satisfy control requirements for process start-up operation nor abnormal control upsets or wide set point changes.

In order to reduce the width of the proportional band required to manipulate a given set of process conditions and also to cope more effectively with process start-up requirements, etc., rate or derivative action must be added to the controller. Rate action control will, in effect, advance the proportional action by an adjustable period of time and to an extent dependent upon the rate, or speed, at which the process conditions changes. It is apparent, however, that this function tends to reduce the rate at which the process condition changes upon control upsets or process start-up. By its nature, rate action also has a tendency to head off a control upset.

While rate action, by itself, is an effective stabilizing function which does not require critical adjustment for variable process changes, it nevertheless does lose its effectiveness and non-critical behavior when used in conjunction with automatic reset action. Rate action, just like proportional action, will effect the automatic reset action. Thus, a deviation from the ideal rate action setting for a particular set of operating conditions, (which, by itself, would merely reduce the stabilizing effect) may result in an unstable system when automatic reset is involved.

The foregoing analysis of control functions pertains primarily to conventional systems of the position-proportioning type. However, with a few exceptions, it is also applicable to time-proportioning systems of conventional type.

Generally, the conventional systems incorporate four manually-adjustable control functions, namely, proportional band, automatic reset, rate control and means to satisfy the supply-demand ratio (such as, manual valve positioning adjustment, impulse frequency or duty cycle adjustment, etc.) in addition to provision for manual start-up. While each function, by itself, is designed to cope with one or more essential process requirements, when these functions are operating together in one system they greatly effect one another whereby the overall result becomes an extremely complex function. For all practical purposes, the magnitudes and tendencies of these functions and their combined effect upon the process is not clearly predictable. Even with a mathematical approach, or with the aid of frequency response analysis in determining the approximate control settings and adjustments, the final tuning of the system controller still requires a great deal of trial and error adjustments to be performed by a highly experienced and skilled operator. With a conventional controller, it is very difficult, if not impossible, to establish a combination of control adjustments which will satisfactorily meet the process start-up requirements and larger order system disturbances, as well as the maintenance requirements normally involving medium to small order control upsets. A given combination of control adjustments, tuned for optimum performance to specific process requirements will perform satisfactorily only within a very narrow band of deviations from the specific requirements. Relatively small deviations from such band, due to lag changes in the system, changes in the load supply ratio, etc., may require complete retuning of the control adjustments. Such frequent, time-consuming adjustments to be made in conventional control systems contribute substantially to the objectionable and costly time during which the process is not in operation.

The controller which is the subject of this invention is based upon different concepts of desirable control functions. Such controller is of the time proportioning type wherein the energy supplied to the process consists of on-off pulses having a time duration which is in proportion to the deviations of the process from the set point. The proportional action is non-linear and is effective only when process deviations are below the set point. Conventional type manual adjustments for integral, derivative, automatic reset and rate functions are eliminated as well as individual supply-demand ratio and duty cycle adjustments. The desirable and necessary effects of these conventional control functions essentially have been replaced by several adaptive control function electrical networks. The new controller has but two manual control adjustments, specifically, for adjusting the width of the proportional band and for adjustment of a so-called load range factor, as will be described in detail hereinbelow. Further, apparatus functions automatically from process start-up to the set point control level.

Reference now is made to FIGURE 5, which is a schematic diagram of a control system incorporating a controller made in accordance with this invention. The primary electrical circuit comprises a transmitting potentiometer 20, a Set Point Potentiometer 21, and a Proportional Band Potentiometer 22, all connected in parallel across a Constant Voltage Source 22a. The Transmitting Potentiometer 20 will be mechanically coupled to any primary measuring instrument capable of positioning the slider 23 in correspondence with changes in the condition of a process under control. In the specific case of a temperature controller, the Transmitting Potentiometer is coupled to a self-balancing potentiometer recorder R whereby the position of the slider 23 provides a voltage $E_1$ corresponding at all times to the process level as sensed by a thermocouple in the furnace L. The primary circuit also includes various resistors and reactive components which, in combination with the switching contacts actuated by the Control Relay $K_1$, provide the necessary input signal for the amplifier 27 across the resistor 26. The secondary circuit comprises the Control Relay $K_1$ driven by the amplifier output, a time-delay network 29, a power supply P and a Load Relay $K_2$. The movable contacts of the switching contacts A, B, C and D are coupled together and are actuated in unison upon energization of the operating coil 25 of the Control Relay $K_1$. Whereas the contact sets B, C and D manipulate the basic input signal $E_2 \pm E_1$ in its conversion to a suitable automatic control signal, the contact set A actuates the Load Relay $K_2$. The contact set F, of the Load Relay, controls the actuation of the final control element either directly or through an intermediate contactor.

The operation of the complete control circuit will now be described in detail.

*Steady state operation of system*

In order to facilitate an understanding of the circuit operation, a steady state condition of the system will be described first, it being now assumed that the process level (determined by the position of the slider 23 of the Transmitting Potentiometer 20) is at or above the set point level (as determined by the position of the slider 24 on the Set Point Potentiometer 21). Under such conditions, the voltage $E_1$ is equal to or greater than the voltage $E_2$, whereby the voltage $E_3$ appearing across the capacitor 30 is zero (0) or some negative value, it being noted that one side of the capacitor is connected directly to the set point slider 24 and the other side is connected to the transmitter slider 23 through the closed contacts D. It will also be noted that the amplifier input resistor 26 is connected directly across the capacitor 30, by the leads 31, 32 on one side, and on the other side by the lead 34, resistor 35, lead 36 and lead 37. Consequently, the voltage V across the resistor 26, also is zero or some negative value. With such input, the amplifier output is zero, the relays $K_1$ and $K_2$ remain de-energized and no energy is supplied to the process. It is here pointed out that no energy is supplied to the process for any excursion of the process level above the set point.

Now, as the process level decreases, due to the absence of input energy, a condition will be reached where $E_1 < E_2$ whereby the voltages $E_3$ appearing across the capacitor 30, the voltage $E_5$ appearing across the capacitor 40 and the voltage V appearing across the amplifier input, are all positive. Under this condition, the amplifier output is a positive voltage of sufficient magnitude to operate the Control Relay $K_1$ and transfer the relay contact sets A, B, C and D to the right or ON positions. The closure of the contact set A to the ON position energizes the Load Relay $K_2$ and switches contact set F to the ON position thereby supplying maximum energy to the process which, for further reference purposes, may be termed "control event A."

At the instant that the amplifier responds to the positive voltage V, the capacitor 30 is disconnected from its charging voltage source $E_2 - E_1$ (by reason of the closure of the contact set D to the right). Consequently, the voltage charge $E_3$ of the capacitor 30, will decrease exponentially at a time constant determined by the values of the capacitor 30 and the resistors 26, 35 and 53. Eventually, the voltage $E_3$ reduces to zero and the control relay $K_1$ is again de-energized with the contact sets A, B, C and D returning to the illustrated positions, which, for further reference, will be termed "control event B."

The duration of the process "ON time" is proportional to the magnitude of the time-integral of the instantaneous process deviation $(E_2 - E_1 = E_3)$ as discharged by the capacitor 30 into the resistors 26 and 35. During the "ON time" interval, when the contact sets B and C are closed to the right, the capacitor 40 is connected directly across the lower portion of the Proportional Band Potentiometer 22 whereby a voltage $E_5$ will build up across the capacitor, which voltage eventually becomes equal to $E_4$, the output voltage of the potentiometer. Thus, when the control Relay $K_1$ is de-energized, the starting conditions of the control cycle again prevail, except that the voltage $E_5$ now is not zero but has a negative value in opposition to the voltage $E_1$. Assuming that at the start of "control event B," $E_5$ is sufficiently high so that a negative voltage $-V$ prevails at the amplifier input, the duration of such energy off-time condition will then depend upon four control functions;

(1) The initial magnitude of the charge $E_5$ on the capacitor 40, which is determined by the manual setting of the slider 50 of the Proportional Band Potentiometer 22 and, therefore, represents the percentage of the proportional band width setting;

(2) The time integral of the voltage $E_5$ as discharged by the capacitor 40 into the resistors 45 and 26;

(3) The initial magnitude of the voltage $E_3$ which is the deviation of the process condition from the set point; and (4) The first derivative, or rate of change, of the voltage $E_3$.

As the capacitor 40 discharges its voltage $-E_5$ through the resistor 26, the voltage across this resistor will diminish to zero and then increase to a positive value (assuming the process level is still below the set point i.e., $E_1 < E_2$) and "control event A" takes place again.

It is apparent that the first "control event A" brought about by a minimum value of $E_2 - E_1$ (below the set point deviation) will last a minimum time. Also, the first occurrence of "control event B," where the preset, fixed value of $E_4$ (proportional band setting) is opposed by the least value of $E_2 - E_1$, will last the longest. If, during "control event B" (load supply OFF time) the preceding effect of "control event A" (load supply ON time) has returned the process level to or above the set point level, $E_1 \geqq E_2$, the voltage V is zero or negative and the relays $K_1$ and $K_2$ will remain in the OFF position, and this is so even after the voltage $-V$ reduces to zero. Again, no control action will take place until the process level falls slightly below the set point level at which time essentially the same described control cycle will be repeated.

Although a more detailed operational description will be given hereinbelow, it is appropriate, at this point, to call attention to the Load Range Adjuster 51, which consists of the two adjustable resistors 52 and 53 which have movable sliders connected together mechanically for simultaneous operation thereof. It will be noted that the resistor 53 is connected directly to the right side of the capacitor 30 by the leads 54 and 32 and that such resistor is connected to the left side of this capacitor by the leads 55 and 37 when the contact set D is closed to the right, that is, during the ON cycle of the control. Thus, the selected or preset, portion of the resistor 53 decreases the discharge time of the capacitor 30 and, as a consequence, decreases the time during which the amplifier input voltage V remains above the zero level and, therefore, decreases the ON time of the system, all other conditions being constant.

The ideal setting of the Load Range Adjuster 51 and the Proportional Band Slider 50 will result in system ON and OFF time combinations which will nicely balance the load demand of the particular process thereby providing an optimum control function to maintain the process at the set point level.

It is important to note that under steady state operating conditions, relatively wide deviations from the ideal control settings will not result in an objectionable control behavior of the system. This is due to the inherent system characteristic of unidirectional control action. As long as the minimum requirement for system ON and OFF time periods is met, proper control, although not necessarily optimum control, will take place. With the load range setting higher than the minimum requirement, virtually no change in the control action takes place since the duration of the first ON pulse, based on the minimum value of $E_2-E_1$ and the threshold sensitivity of the amplifier, is essentially a function of the operating parameters of the relays $K_1$ and $K_2$ rather than the discharge time of the capacitor 40. With a proportional band setting wider than the minimum requirement, the normally imperceptible periodic deviation of the process from the set point level will slightly increase to a visible degree, since the OFF time, being longer than necessary, may permit the process condition to deviate further from the set point, inasmuch as a greater voltage differential, $E_2-E_1$, will result in a longer ON pulse. If, however, the proportional band width is much wider than the minimum requirement, the process will fall below the set point since the excessively long OFF period will represent a substantial loss of supply energy which will not be compensated for fully by the less-frequent, although longer, ON periods.

*Dynamic operation of the system*

It will now be assumed that the system is greatly unbalanced as at start-up of the process. Immediately following energization of the system, "control event A" takes place, that is, the Control Relay $K_1$ is energized as $E_1<E_2$. As described hereinabove, the duration of "control event A" is a function of the magnitude and time integral of the instantaneous value of the process deviation from the set point value. After the discharge of the voltage $E_3$ through the amplifier input resistor 26, the voltage V falls to zero and the Control Relay $K_1$ is de-energized, whereby "control event B" takes place, provided the voltage $E_5$ across the capacitor 40, will produce a voltage $-V$ across the resistor 26, which is greater in magnitude than the $+V$ voltage produced by the new charge $E_3$ existing across the capacitor 30. However, if the voltage $E_5$ is not sufficient to override the effect of $E_3$ a positive level $(+V)$ is restored across the resistor 26 and the Control Relay $K_1$ will be re-energized almost instantly. Under such conditions, the Time Delay network will not permit the relay $K_2$ to drop out during the extremely short transient switching time of the relay $K_1$. Consequently, the "control event B" (energy supply OFF) will not materialize even though the Control Relay $K_1$ passes through its normal ON-OFF cycles. Under these operating conditions, the energy supply is on continuously. There is no proportional action and the process level is said to be beyond the proportional band.

As the process level rises, a point will be reached where the positive voltage $(+V)$, across the resistor 26, arising by reason of the capacitor discharge voltage $E_3$ will be slightly less in magnitude than the similar opposed voltage arising by reason of the capacitor discharge voltage $E_5$, during the period when the relay $K_1$ is de-energized, and "control event B" will take place in the form of short OFF pulses. At this point, the process level is entering the proportional band. Starting from this point, proportional action will continue until the process level equals the set point level. From FIGURE 5, it will be apparent that the extent of the proportional band width is adjustable by means of the slider 50 for 0–100% of the full control range.

A better understanding of the type of proportional response which results in the most efficient control action will be had by reference to the graph of FIGURE 4. This graph represents a typical single capacity process response characteristic caused by a load step change in a typical control system. The load demand and the proportional input are plotted in terms of B.t.u.'s whereas the response of the process is plotted in terms of temperature, degrees F. Assumed is a process level of 100° F. for steady state, pre-start-up conditions, requiring no energy input. At time unit zero (0), load step change No. 1 occurs which requires energy to be supplied to the process. In an open loop control system, the process response is shown by curve No. 1. During the first time unit, there is no response due to the velocity distance lag of the system. After this, there is an exponential decrease in the process temperature, at a slope determined by the capacity lag of the process, until a final maximum temperature is reached corresponding to the maximum input.

When the load step change is to have a controlled magnitude, such as 400° F. set point level, the process control loop must be closed and, depending upon the type of control action, different types of response characteristics will be obtained. It is obvious that the most desirable response characteristic is one which will elevate the process medium to the set point level in the shortest possible time without overshoot. It is also evident that the shortest possible time period depends directly upon the velocity distance lag, the slope of the exponential process response and the corresponding thermal inertia of the process. The ideal control action resulting in the shortest response time is represented by curve No. 2, whereby, starting at zero (0) time, the energy input is a maximum for approximately 13 time units and then suddenly reduced to the load demand level of 1,000 B.t.u. The process level will then continue to rise on an exponential curve for about 1 time unit, after which the temperature rises decreases logarithmetically in accordance with the decaying thermal inertia until the set point level is reached in some 20 time units. At this time, the thermal inertia is completely dissipated. It can be seen that this type of control action relies upon a set of given, fixed control parameters (set point, load demand, velocity distance lag, slope of the curve, etc.) and upon the accurate timing of a single instantaneous control action at point Y. In practice, the control parameters are subject to wide variations and a correct single instant control action cannot be predicted automatically. Also, since no control action takes place after the point Y, other than a continuous 1,000 B.t.u. energy input, the process would be essentially uncontrollable should any change occur between the point Y and the set point level.

A proportional type of control action offers a more flexible and adaptive means of control whereby continuous proportional control manipulates the process as it enters the proportional band and until the set point is reached. In this case, the input energy is proportionately, rather than suddenly, reduced to the 1,000 B.t.u. load demand for the set point, and, therefore, more time will be required to level out the initial exponential slope of the response curve to the set point, without overshoot. Proportional control action, therefore, must begin at a lower process level as compared to the starting level of single action control.

Response curves No. 3 and No. 4, FIGURE 4, each represents proportional control action characteristics. Curve No. 3 is based upon a non-linear proportional action, that is, the proportionality of energy reduction increases as the process level approaches the set point level. This permits the use of a relatively wide proportional control band at a comparatively small increase in process response time. The wider the control band, the more readily will the automatic control functions cope with process deviations from the set point, since process information required for anticipatory and/or adaptive control actions is made available at an earlier stage. The wider control band also extends the controllability of the process over a wider range of variations. Further, the non-linear proportional action also causes very strong attenuation of the energy input near the set point. This important characteristic is mainly responsible for the systems capability to cope with substantial load demand changes without resorting to the inherently instable type of conventional automatic reset action.

Response curve No. 4 is based on linear proportional action. The width of the proportional band is the same as in curve No. 3, starting at point X. It can be seen that the resulting process response time is considerably longer than with non-linear control action. Particularly, the final portion of the approach to the set point is extremely gradual, compared to non-linear control action. This is due to the strong attenuation of the supply energy at the beginning of the control band and the gradual weak attenuation near the set point. Response curves No. 5, No. 6 and No. 7 correspond to load change No. 2 calling for 2,000 B.t.u. load demand. Curve No. 6 indicates the better load compensating characteristic of the non-linear proportional action. From the preceding analysis, it becomes evident that non-linear proportional action, as compared to linear action, provides a better mode of control in that, for a given width of the control band, the response time for the process to reach the set point level is considerably shorter. Further, the extent of control offset, for a given load change, is much less, it being noted the control offset caused by step change No. 2 is 10° F. for the non-linear proportional curve No. 6 as compared to about 100° F. for the linear proportional curve No. 7. For these, and other reasons, I incorporate a non-linear, unidirectional proportional action in my novel controller.

Continuing with the analysis of system operation from process start-up, and with specific reference to FIGURE 5, it will be recalled that we reached the point where the process condition entered the proportional band. Now, as the process level continues to rise, the initial magnitude of the voltage $E_3$ after each duty cycle (Relay $K_1$ closing to the ON position and opening to the OFF position) will become smaller whereas the magnitude of the voltage $E_5$ remains constant (assuming no change in the setting of the Proportional Band slider 50). As a result, the supply of input energy to the process, per unit of time, will be reduced in correspondence with the ON-OFF ratio of the duty cycle. The respective ON and OFF times, for any given static deviation of the process level from the set point level are plotted in FIGURE 6. The expression "% PROP. BAND/10," included in the legends of the ON and OFF time curves, denotes that the corresponding ordinate values should be divided by a factor of 10. This is done to illustrate the expanded, lower portions of the ON and OFF time curves. It will be noted that the ON time remains substantially constant from 100 to 50% deviation of the process level below the set point level and gradually decreases to only one half its maximum value when the process level is only 3% away from the set point. This characteristic (which is obtained by utilizing an extremely sensitive amplifier so that even a feeble capacitor discharge current flowing through the resistor 26 will result in energization of the Control Relay $K_1$) is responsible for the very desirable arrangement of a variable rather than a fixed duty cycle, or pulse period, with the longest interval occurring at a point immediately below the set point operation. In effect, the switching frequency of the final control element is thus kept at a minimum for steady state operating conditions of the system.

While the described non-linear proportional control action and its by-functions provides a more effective control over a wider range of variable process conditions than does a linear proportional control action, more is required to completetly satisfy the concept of automatic control. The adjustability of the proportional band width, by itself, would restrict the use of the system to a relatively narrow range of process variations such as, for example, load changes, lag changes, changes in the ratio of load demand to supply, etc.

One of the features incorporated in my controller for the purpose of providing a complete automatic control has already been mentioned hereinabove, namely, the Load Range Adjuster 51. The load range adjustment comprises two separate functions, the combined effect of which, upon the process, enables the control system to cope with a wide range of process load conditions. The relative ON time of the Control Relay $K_1$ (duration of energy input to the process) is a function of the initial magnitude of the voltage $E_3$ (corresponding to the extent of process deviation below the set point level) and the time integral of the decay thereof through the resistors 26 and 35. As such, this function does not take into account the process response characteristics and load conditions. Specifically, if an ON time of 10 seconds will satisfy control requirements for a 5,000 B.t.u. load, for a given process deviation from the set point, the same ON time will not satisfy, to the same extent, a load requirement of 2,000 B.t.u. In order to accommodate the ON time to various process and load characteristics, the variable resistor 53 is provided. This resistor, which is ineffective during the system OFF period, becomes connected across the capacitor 30 during the system ON period, that is, during the time when the contact set D is closed to the right. When so connected, the resistor 53 becomes part of the discharge circuit of the capacitor and shortens the relative ON time of the system in accordance with the new time constant.

Another, and very important, feature of the circuit is the inherent adaptive rate action which will now be described in detail.

*Adaptive rate action*

Reference, again, is made to FIGURE 4, showing the relative response characteristics of various control functions for a step change in the load. Analysis of the response characteristic of a undirectional, non-linear proportional system indicates that;

(a) The energy input at and above the set point level is zero;

(b) In order to satisfy a load demand of 1,000 B.t.u. for step change No. 1 without a visible control offset, requires a maximum energy input supply of the order of 10,000 B.t.u. (supply to demand ratio of 11:1);

(c) A load change to 2,000 B.t.u. demand will cause a 10° F. control offset.

In effect, this means that, first, there is no control action for process deviations above the set point and, second, the energy supply to load demand ratio must be rather high (10 to 1).

The first effect, (a) above, is generally desirable inasmuch as the natural rate of decay of the process results in the fastest return to the set point level. However, it is recognized that the exception to this statement is a condition wherein long process lags would result in considerable undershoot of the set point level.

The second effect, (b) above, is in general, no handicap since the provision of the additional power supply usually presents no problem and, further, the actual supply to demand ratio is not critical as long as it is relatively high. The one possible disadvantage, however, arises in the case of an existing process installation initially designed for a relatively low supply to demand ratio.

The third effect, (c) above, while resulting in considerably less offset than an equivalent, conventional proportional system, nevertheless, results in a substantial offset when compared to a conventional system incorporating an automatic reset function. For this reason, I incorporate, in my controller, an adjustable, adaptive rate control function which provides an automatic, dynamic adjustment of the basic proportional action and its by-functions in a manner adaptive to the prevailing control requirements. Specifically, if a balanced process control is disturbed by either a sudden load increase or by a supply energy decrease, the adaptive rate control circuit will increase the relative proportional energy input to restore a balanced control condition. The extent to which this corrective function will compensate for such disturbances is primarily dependent upon the setting of the load range adjuster 51, shown in FIGURE 5, to which figure continued reference now is made.

The adjustable, adaptive rate control circuit comprises the adjustable resistor 52 (of the Load Range Adjuster 51), the capacitor 57 and the resistor 59. In order to analyze the operation of such circuit, it is necessary to consider three primary process conditions, namely, process start-up, balanced control at the set point level and process upsets.

At process start-up, $E_1 < E_2$, $E_3 = E_2 - E_1$ and is positive in sign, and $E_5 = 0$. Consequently, the amplifier input voltage V is positive. Inasmuch as the process is static, the charge on the capacitor 57 is static and no rate current $I_r$ will flow in the lead 60. The positive input voltage to the amplifier ($+V$) energizes the coil of the Control Relay $K_1$ causing a closure of all contact sets A, B, C and D to the ON position and causing a closure of the contacts F, of the Load Relay $K_2$, to the ON position whereby energy is supplied to the process. As the value of $E_1$ increases, due to the energy input, the charge on the capacitor 57 changes causing a negative current, $-I_r$ to flow through the resistors 59 and 26. Such current flow through the amplifier input resistor 26 opposes the discharge current of the capacitor 30 through the same resistor. Consequently, the voltage $+V$ will be reduced at a rate which effectively amounts to decreasing the discharge time of the capacitor 30, and, therefore, shortening the ON time of the Control Relay $K_1$. However, assuming that the process is still below the start of the proportional band (that is, at the instant relay $K_1$ returns to the OFF position $E_2 - E_1 > E_5$), the shorter ON time of the relay $K_1$ will not effect the process trend as the time delay factor for the Relay $K_2$ results in the contacts F remaining in the ON position, thus maintaining the supply of input energy to the process. When, however, due to such continuous supply of energy to the process, $E_2 - E_1 < E_5$, proportional action takes place. Starting at this point, the negative rate current $(-I_r)$ will effect both the ON and OFF time periods of the Relay $K_2$.

As long as the process level is increasing toward the set point level, the differential $E_2 - E_1$ decreases, and the negative rate current $-I_r$, flowing through the amplifier input resistor 26, will oppose the capacitor 30 discharge current through this resistor and aid the reverse capacitor 40 discharge current, thus having the effect of decreasing system ON time and increasing system OFF time. It will be noted that the movable arms of the Load Range Adjuster Resistors 52 and 53 are mechnically coupled for simultaneous movement. A movement of these arms to the left increases the active portion of the resistor 52 which is in series with the capacitor 57 and simultaneously decreases the active portion of the resistor 53 that is connected across the capacitor 30 when the contact set D is in the ON position. The former controls the magnitude of the rate current $I_r$ whereas the latter controls the discharge rate of the capacitor 30. This arrangement permits manual adjustment of the system ON and OFF time periods which, in turn, effect the otherwise normal ON and OFF time periods as established by the values of $E_2 - E_1$ and $E_5$ which, in turn, depend upon the extent to which the process level lies below the set point level and the setting of the proportional band width by the slider 50. The combined effect of such change in system ON and OFF time periods upon the process is a slowing down to a minimum of the rate at which the process level rises as it approaches the set point level. The actual such rate of process level rise will depend upon the setting of the Load Range Adjuster 51. It is to be noted, however, that in any event, the closer the process level is to the set point level (that is, the smaller the differential $E_2 - E_1$) the stronger will be the braking effect of the described adaptive rate action. In fact, the adaptive rate action actually will override the proportional action when the voltage drop across the resistor 26 ($-I_r \times$ ohmic value of resistor 26) is greater than the value $+V$.

Since the described rate action increases the OFF time of the system as the differential $E_2 - E_1$ decreases, the Relay $K_2$ will be continuously in the OFF position at some point before the process level reaches the set point level. Thus, the system has an inherent tendency to reduce the rate of process level rise to nearly zero shortly before the set point is reached. This effect is highly desirable as, for a given setting of the Load Range Adjuster 51 and the Proportional Band Potentiometer 22, a wider range of process variations can be handled without excessive overshoot on process start-up.

Assuming, now, a balanced control condition wherein the control settings 50 and 51 are nearly correct, the rate of process change is zero as the set point has been reached. Consequently, there is no rate action. The duration of the system ON and OFF periods will balance the energy input with the load demand resulting essentially in straight line control, or balanced control, whereby the factors $I_r$ and $E_2 - E_1$ are each nearly zero.

However, when the balanced control condition is now upset, as, for example, by a load step change No. 2 shown in FIGURE 4, the process level, in the absence of the adaptive rate action, will drop 10° F. in order for the proportional action to deliver 2,000 B.t.u. input to satisfy the new load demand. With the adaptive rate action, the proportional energy input to the process is supplemented by what may be termed rate energy input at the instant that the process begins to fall below the set point level. As $E_2 - E_1$ increases, a positive rate current ($+I_r$) will flow through the lead 60. Such positive rate current now will flow in the same direction as the discharge current of the capacitor 30 (thereby increasing the system ON time) and in a direction opposing the discharge current of the capacitor 40 (thereby decreasing the system OFF time). Such combined effect increases the energy supplied to the process per unit time. The extent of such energy per unit time increase is a direct function of the rate at which the process deviates from the set point level and will last as long as the process level is changing in a downward direction. As a result of the increase in the rate at which energy is supplied to the process, the process level will only deviate a small amount and tend to return toward the set point level. There, a new control cycle is initiated. Obviously, such control action is cyclical in character, but with the correct or nearly correct settings of the controls 22 and 51, the cycling of the process about the set point level is almost imperceptible on conventional primary measuring instruments.

The described rate action is immediately adaptive to system conditions in that the greater the rate of process deviation caused by a step change in the load, the greater will be the energy per time supplied to the process. In fact, the adaptive rate action may result in a continuous input energy supply to the process until shortly before the trend of the process deviation from the set point level is reversed, provided, of course, that the rate of process deviation is significant. As the process deviation reverses direction and moves upwardly toward the set point, the positive rate current ($+I_r$) becomes ($-I_r$) thereby again tending to slow down the rate at which the process level approaches the set point so as to prevent overshoot.

If the control upset, caused by the step change in the load, requires less energy input to the process, the process level will rise above the set point value. Now, since $E_1 > E_2$, both $E_3$ and V become negative and the Time Delay Relay $K_2$ remains in the OFF position. Under this condition, the rate current is negative ($-I_r$) thereby imposing no change on the system operation. With no energy input, the process returns to the set point level at a maximum rate. In the absence of the adaptive rate action, the process return rate is uncontrolled and, therefore, may result in substantial undershoot, since the proportional action is effective only below the set point. However, with the adaptive rate action, the process return rate will result in a positive voltage drop ($+I_rR$) across the resistor 26 which drop will override the negative drop across this resistor at some point before the process returns to the set point level, thereby causing energy input to the process which reduces the process return rate.

It is important to note that the control effects of the adaptive rate action will always be in phase with the prevailing process trend which, in turn, makes the rate action an inherently stable control function.

The relative system ON time and the adaptive rate control adjustments are mechanically coupled together because of their close relationship to the prevailing process characteristics. Specifically, a process having a high supply to demand ratio will require a short relative system ON time to maintain the set point level and such process will respond to a given length of system ON time with a faster approach to the set point thereby requiring a lower setting of the adaptive rate control. Both of these requirements are met by the Load Range Adjuster 51.

Another important feature of the new controller is an inherent adaptive proportional action which will now be described.

*Adaptive proportional action*

The system analysis to this point reveals three basic counter functions designed to prevent or reduce control offsets due to normal variations in the operating conditions, such as, load changes, supply changes, etc. These counter functions are (1) unidirectional proportional action preventing control offsets above the set point, (2) non-linear proportional action and, (3) adaptive rate control, the latter two functions reducing offsets below the set point. It will be noted that the adaptive rate action is effective only under dynamic, or cycling, control conditions, and, therefore, is not effective under balanced control conditions. If, for example, the cause of the system upset is extremely gradual, rather than a step load change, the adaptive rate action is almost ineffective, excepting, of course, the fact that such action still makes possible the use of a relatively narrow proportional band thereby reducing the offset. If, therefore, the cause of the control upset is very gradual, the adaptive rate control action will not prevent a gradual control offset below the set point level to the extent limited by the width of the proportional band only.

This condition is desirably reduced by the introduction of the resistor 62 in the proportional band circuit, which resistor makes the proportion function an adaptive one under certain circuit operating conditions. In the circuit diagram of FIGURE 5, the resistor 62 is shown shorted out of the circuit by the lead 63 for purposes of describing the proportional action, hereinabove. It must now be remembered that the shorting lead is broken whereby the circuit between the proportional band slider 50 and the right, fixed contact of the contact set B is completed through the resistor 62.

In effect, the resistor 62 automatically reduces the width of the basic proportional band as the process approaches the set point level, thus reducing the control offset.

Functionally, the resistor 62 is assigned an ohmic value such that its effect upon circuit operation is limited to periods when the process level is a relatively small distance below the set point level. In operation, this resistor reduces the rate of charge of the capacitor 40 while the relay $K_1$ is in the ON position thereby increasing the length of time required for the capacitor to reach a fully charged state. It will be assumed that the charging time of the capacitor 40 is 10 seconds with the resistor 62 in the circuit, as compared to a substantially instantaneous charging of the capacitor without the resistor connected in series therewith. Obviously, the time available for the charging of the capacitor 40 is equal to the ON time of the Control Relay $K_1$. As described hereinabove, the ON time of the relay $K_1$ basically is a function of the differential $E_2 - E_1$ and such ON time decreases as the value of $E_1$ (the process level) approaches that of $E_2$ (set point level) and will be zero (0) when $E_1 \geqq E_2$.

The functioning of the adaptive proportional function will be better understood by a typical example shown in FIGURE 7. Here, the control settings of the system (see, also, FIGURE 5) are assumed to be as follows:

(a) The proportional band setting is 100%, that is, the Proportional Band Potentiometer slider is set at the uppermost point;

(b) The Load Range Adjuster 51 is set at the 100 mark; and (c) The set point is at full scale, that is, the Set Point Potentiometer slider 24 is at the uppermost point.

Under these conditions, the relay $K_1$ ON time will be in excess of the 10 seconds charge time for the capacitor 40 as long as the process level is below the set point by more than 2% of the full control span. Consequently, the resistor 62 will not reduce the basic width of the proportional band and, therefore, there will be no adaptive proportional control action. As the differential between the set point level and the process level becomes less than 2% of the full control span, the ON time of the relay $K_1$ becomes shorter than 10 seconds and the effect of the resistor 62 is to reduce the width of the basic proportional band to the adaptive proportional band. Such decrease is exponential, being very gradual at the beginning and very steep when the process level is only fractions of 1% of full span away from the set point level.

The drastic reduction of the proportional band width, more specifically the reduction of the OFF time of the relay $K_2$ near the set point, will tend to change the normally balanced type of steady state control operation below the set point level to a slightly cyclical control operation about the set point.

The adaptive proportional action, producing a greater number of ON time pulses, of the relay $K_1$, of a given duration per unit of time, will increase the energy input to the process until the process level reaches or exceeds the set point level. Such action will be repeated as the process again falls below the set point level. Assume that a process load requiring, say, 5 ON pulses in five minutes in order for its level to be elevated from a point slightly below to a point slightly above the set point level. If this load is very gradually increased so that its level does not increase after the 5 ON pulses in five minutes the adaptive proportional action continues to provide energy input to the process at a rate of one pulse per minute until the set point level is attained. This will be so unless a continued increase of load demand exceeds the one pulse per minute energy supply, in which case a gradual control offset below the set point will take place.

From the above description of the invention, it will be apparent that characteristics and operating principles of the system differ radically from those of equivalent conventional systems and, thereby, offers numerous distinct features and advantages which may be summarized as follows:

Non-linear proportional action. This substantially reduces the need of an inherently unstable automatic reset function. This action provides a more effective control over wider ranges of process variations, such as, start-up, load changes, etc. Further, such action permits the use of a relatively wide proportional band without substantial increase in the load change control offsets.

Unidirectional proportional control. This eliminates the need for a manual relative input energy adjustment (such as valve positioning, cycle frequency, etc.), in accordance with the variable supply-demand ratio for each load or set point change. This function makes the set point a fixed reference for the proportional band, thus providing a uniform proportional action response for a given process deviation from a set point regardless of the prevailing supply-demand ratio. Further, this function eliminates hunting normally arising from a bi-directional, out-of-phase, proportional action and prevents dangerous control offsets, due to a decreasing load change, when the process level is above the set point level.

Adaptive rate and proportional action. Both of these functions substantially increase the load-compensating capability of the system. The rate action greatly increases control stability and permits the use of a relatively narrow proportional band without excessive increase in control cycling. Both functions are automatic and their intended corrective actions are always adaptive to the system conditions and in phase with the process tendency.

Non-critical control adjustments. The new control system includes only two manual control adjustments whose individual functions are essentially independent. Consequently, the control effects of these adjustments are predictable thereby eliminating confusing and extremely time-consuming trial and error methods required with conventional control adjustments. Also, the settings of these two adjustments may deviate substantially from ideal values without introducing harmful control effects.

The controller made in accordance with this invention is time-proportioning and can be used either directly to control the supply of electrical energy to a process by means of the Load Relay $K_2$ shown in FIGURE 5, or in combination with other final control elements of the on-off or high-low type. The apparatus is employed, generally, with a self-balancing indicator or self-balancing indicating recorder equipped with a transmitting slide wire. Importantly, the unstable automatic reset function, requiring very critical adjustment, has been eliminated and rate action is automatic and an integral function of the controller. A wide (100%) proportional band can be used even though the automatic reset requirement has been eliminated. System hunting or wild oscillation is avoided by the new concept of limiting proportional action to the low side of the set point.

In conventional control systems having proportional band and rate action, system hunting can result in a positive offset under certain load conditions, thereby resulting in an overheating of the furnace, or runaway action. Also, effective rate action, for a given rate of change and rate of adjustment, is a function of the width of the proportional band. The rate action increases with a decrease in the proportional band width. Considering the fact that a fast-responding process generally requires a relatively narrow proportional band and but little rate control, this interaction between proportional band and rate is, basically, contradictory. Further, the primary function of proportional action is to satisfy the requirements due to first order transfer lags (system capacity) of the system, whereas, the primary function of rate action is to take into account the higher order transfer lag and transportation lag (distance velocity lag). Consequently, in order to establish an efficient setting for each of these control functions (proportional band and rate), complete independence of these functions is essential. Still further, for a given process, the overall system response usually becomes faster at higher temperature control levels, due primarily to the greater thermal conductivity of the control medium. In such case, a narrower proportional band, without change of rate, is necessary to optimize the control.

These shortcomings of existing control systems are avoided in a controller made in accordance with this invention. The system supplies no input energy above the set point regardless of the proportional band or load range settings. In the event the proportional band and load range adjustments vary considerably from optimum settings, the system will produce sustained cycling (as distinguished from hunting) or an offset below the set point (negative offset), depending upon whether the proportional band is too narrow or too wide, respectively. There can be no offset above the set point (positive offset) regardless of the settings of the proportional band and rate and regardless of load. Also, the non-linear and adaptive rate action substantially reduces the negative offset, without the use of reset action. Further, the rate action is independent of the proportional band width. Thus, there is no direct interaction between these two control functions and the setting of each can be established more readily for optimum results. Still further, since the higher order transfer and transportation lags, for a given process, do not change substantially, a given rate setting will be adaptive for a relatively wide range of operating conditions.

Reference now is made to FIGURE 8 which shows the performance of the controller under various conditions, it being noted that the chart has a relatively narrow temperature span of 0–400° F. The inner curve is a record of temperature variations from a set point level of 150° F. for a simulated process arrangement. A glass container approximately 3″ in diameter and 5″ high was substantially filled with water and closed by a stopper. Extending through a central hole formed in the stopper was a thermal insulator in the form of a fiber glass tube of about 1″ diameter. A brass slug about 1″ long was force-fitted into the tube and disposed substantially at the volumetric center of the container. Such slug was provided with a small axial bore within which was disposed a measuring thermocouple. A 100 watt, immersion type electrical heater, formed in a helix, was disposed in the water and spaced a maximum distance from the fiber glass tube.

The test was started at the point $a$ with the Load Range Adjuster 51 (see FIGURE 5) of the controller set at the 20 mark, the proportional band slider was set at the mid-range mark and, of course, the set point slider was set at a point corresponding to 150° F. It will be noted that from process start-up, there was one overshoot and that the system became balanced in about 22 minutes at the point $b$. At point $c$, one-half of the water was removed from the container and at point $d$ all of the water was removed, without visible change in the process temperature on this particular record. Actually, the maximum temperature variation between the points *b* and *d*, as measured by means of an extremely sensitive potentiometer, was less than 0.5° F.

At the point *e*, the container was half filled with cold water (40° F.) and at point *f*, the container was completely filled with cold water. In each case, a temperature drop of some 8–10° F. occurred but the system re-balanced to the set-point level within 10 minutes.

At the point *g*, the controller was changed to a simple ON-OFF control, resulting in wide deviations from the set-point level. Again, at point *h*, one-half of the water was removed from the container, and at point *i* all of the water was removed. At the point *j*, the container was filled with cold water and the controller again converted to operate in accordance with this invention. The relative results of the two control systems are obvious.

In the case of the inner curve, the set-point level and the two manually-adjustable members of my controller (proportional band and load range adjuster) remained fixed throughout the test run. The outer curve illustrates the performance of my controller under conditions wherein these three factors are altered during the test run. In this case, the process load was one gallon of agitated oil and the immersion heater had a rating of approximately 3 kilowatts. At the start of the test, the set-point level was 200° F., the load adjuster was set to the 30 mark and the proportional band potentiometer was set to the 7 mark. It will be noted that the process reached the set-point level within a period of 5 minutes without overshoot. At the point *k*, one-half gallon of oil was removed from the container with no significant change in the process level from the set-point level. At the point *l*, one-half gallon of cold oil (40° F.) was added to the container. This resulted in a process level drop of some 100° F. for a period of only a few minutes. At the point *q*, the set-point level was changed to 350° F., a half gallon of the oil was removed from the container at the point *s* and replaced by a half gallon of cold oil at the point *t*. In each case, the system re-balanced quickly at the set-point level without overshoot. At the various points during the test, the load range adjuster and the proportional band adjuster were changed as follows:

| Point on Curve | Load Range Adjuster Set To— | Proportional Band Set To— |
|---|---|---|
| Start of test | 30 mark | 7 mark |
| *m* | 45 mark | 7 mark |
| *n* | 15 mark | 7 mark |
| *o* | 30 mark | 10½ mark |
| *p* | 30 mark | 3½ mark |
| *q* | 38 mark | 7 mark |
| *u* | 57 mark | 7 mark |
| *v* | 19 mark | 7 mark |
| *w* | 38 mark | 10½ mark |
| *x* | 38 mark | 3½ mark |

It is apparent that the load range and proportional band adjusters are subject to a wide range of settings without significant change in the character of the overall control function of the controller under steady state operating conditions. Since the proportional control function is non-linear and unidirectional, the system re-balances quickly to a given set-point level without hunting and without any danger of runaway action, even from process start-up. The setting of the load range adjuster, which controls the load demand to energy supply ratio effects the overall time required for the system to re-balance upon change in the process load or in the set-point level. This effects the knee of the curve as the process temperature rises to the set-point level. Thus, the operator can apply the controller to a new process from a start-up condition in full confidence that an other than optimum setting of the load range and proportional band adjuster will result only in an unnecessary delay in bringing the process level to the set-point level. In a relatively short time, the average operator will be able to set these adjustments to obtain optimum results under the operating conditions of the particular process.

Having now given a detailed description of the invention, those skilled in this art will be able to make changes and modifications in the specifically illustrated apparatus, thereby to adapt the invention for use in a specific application. It is intended that such changes and modifications shall fall within the scope and spirit of the invention as recited in the following claims.

I claim:

1. In combination, a signal responsive controller for maintaining a condition in a preselected state; means providing a first signal which varies in magnitude and sign with the extent of departure of the condition from the preselected state; means deriving from said first signal a second signal of like sign and equal initial magnitude, which second signal decreases with time; means normally applying the first signal to the controller for actuation thereof to effect a change in the state of the condition; and switch means operated upon actuation of the controller to apply the second signal to the controller in place of the first signal.

2. The invention as recited in claim 1, including means providing a third signal which has a constant sign and a fixed magnitude, and means applying the combined second and third signals to the controller upon operation of the switch means.

3. The invention as recited in claim 2, including means for adjusting the rate of decrease of the second signal upon operation of the switch means.

4. The invention as recited in claim 2, including means for varying the magnitude of the third signal with time.

5. The invention as recited in claim 1, including means providing a third signal which has a like sign with the second signal and which varies in magnitude with the rate of change of the condition, and means applying the combined second and third signals to the controller upon operation of the switch means.

6. In combination,
 (a) a signal responsive controller for maintaining a condition in a preselected state,
 (b) means providing a first signal which varies in magnitude and sign with the extent of departure of the condition from the preselected state,
 (c) means deriving from the first signal a second signal of like sign and equal initial magnitude, which second signal decreases in magnitude with time,
 (d) means for adjusting the rate of decrease of said second signal,
 (e) means providing a third signal of constant sign and which increases in magnitude with time to a predetermined minimum value,
 (f) means providing a fourth signal which has a like sign with the second signal and which varies in magnitude with the rate of change of the condition,
 (g) means normally applying the first signal to the controller for actuation thereof to effect a change in the condition, and
 (h) switch means operated upon actuation of the controller to apply the combined second, third and fourth signals to the controller in place of the first signal.

7. A time-proportioning control system for maintaining a condition in a preselected state comprising:
 (a) means providing a first signal which varies in sign and magnitude with the extent of departure of the condition from the preselected state,
 (b) means deriving from the first signal a second signal of like sign and equal initial magnitude, which second signal decreases with time,
 (c) means providing a third signal of constant sign and having a magnitude which varies non-linearly with the extent of departure of the condition from the preselected state, (d) an amplifier producing an output signal in response to a signal of predetermined sign applied to the input thereof,
(e) means normally applying the first signal to the amplifier input,
(f) power means for effecting a change in the state of the condition, and
(g) control means responsive to the amplifier output signal and actuating said power means,
(h) means combining the second and third signals to produce a resultant signal, and
(i) switch means operated upon actuation of the power means to apply the resultant signal to the amplifier input in place of the first signal.

8. The invention as recited in claim 7, including means for adjusting the rate of decrease of the second signal.

9. The invention as recited in claim 7, including means for varying the magnitude of the third signal with time.

10. The invention as recited in claim 7, including means producing a fourth signal which has a like sign with the second signal and which varies in magnitude with the rate of change of the condition, and means combining the fourth signal with the second and third signals to produce the resultant signal.

11. The invention as recited in claim 10, including means for adjusting the magnitude of the fourth signal for a given rate of change of the condition.

12. A control system for maintaining a process level at a set-point level comprising;
(a) means producing a first voltage $E_1$ which varies in magnitude with the process level,
(b) means producing a second voltage $E_2$ corresponding to the set-point level,
(c) means deriving from the different voltage $E_2-E_1$ a third voltage $E_3$ of like sign and equal initial magnitude, said voltage $E_3$, however, decreasing with time,
(d) an amplifier providing an output voltage when a finite voltage of predetermined sign is applied to the input thereof,
(e) switch means actuated from a normally OFF position to an ON position by the amplifier output voltage,
(f) circuit elements applying the difference voltage $E_2-E_1$ to the amplifier input when the switch means is in the OFF position,
(g) means providing a fourth voltage $E_4$ having a constant sign and a predetermined maximum magnitude,
(h) circuit elements applying the combined voltages $E_3$ and $E_4$ to the amplifier input when the switch means is in the ON position,
(i) and control means actuated when the switch means is in the ON position for supplying energy to the process.

13. The invention as recited in claim 12, including means providing a fifth voltage $E_5$ having a sign corresponding to the voltage $E_3$ and a magnitude which varies with the rate of change of the process level, and circuit elements applying the voltage $E_5$ to the amplifier input in opposition to voltage $E_3$.

14. The invention as recited in claim 13, including means to adjust the magnitude of the voltage $E_5$ for a given rate of change of the process level.

15. The invention as recited in claim 12, including means automatically adjusting the maximum magnitude of the voltage $E_4$ in accordance with the time period during which the said switch means is in the ON position.

16. The invention as recited in claim 12, including manually adjustable means to adjust the magnitude of the voltage $E_5$ for a given rate of change of the process level, and means automatically adjusting the maximum magnitude of the voltage $E_4$ in accordance with the time period during which the switch means is in the ON position.

17. The invention as recited in claim 12, including means delaying the deactuation of said control means when the switch means transfers from the ON to the OFF position.

18. A temperature control system for maintaining the temperature of a process at a predetermined set-point level comprising;
(a) means producing a voltage $E_1$ which varies in magnitude with the process temperature,
(b) means producing a reference voltage $E_2$ having a constant sign and a magnitude corresponding to the said set-point temperature,
(c) an amplifier having an input resistor,
(d) switch means actuated by the amplifier from a normally OFF position to an ON position when the voltage across the amplifier input resistor is a finite value of predetermined sign,
(e) a first capacitor,
(f) circuit elements for applying the difference voltage $E_2-E_1$ across the first capacitor and across the amplifier input resistor when the said switch means is in the OFF position,
(g) circuit elements for discharging the said first capacitor through the amplifier input resistor when the said switch means is in the ON position,
(h) a source of voltage $E_3$ of constant sign and fixed, predetermined magnitude,
(i) a second capacitor,
(j) circuit elements for charging the second capacitor by the voltage $E_3$ when the said switch means is in the ON position,
(k) circuit elements for discharging the second capacitor in a reverse direction through the amplifier input resistor when the said switch means is in the OFF position,
(l) a source of energy, and
(m) a control element actuated when said switch means is in the ON position to supply energy from said source to the process.

19. The invention as recited in claim 18, wherein the said control element is a relay having a set of contacts movable from a normally OFF position to an ON position and having means delaying the movement of said set of contacts from the OFF to the ON position.

20. The invention as recited in claim 18, including manually adjustable means to change the discharge rate of the said first capacitor through the amplifier input resistor.

21. The invention as recited in claim 18, including means to increase the charging time of the said second capacitor.

22. The invention as recited in claim 18, including a third capacitor, circuit elements for charging the third capacitor in a direction and at a rate corresponding to the rate of change of the difference voltage $E_2-E_1$, and circuit elements for discharging the third capacitor through the amplifier input resistor in a sense opposite to that of the first capacitor when the said switch means is in the ON position.

23. The invention as recited in claim 22, including manually adjustable means to change the charging rate of the said third capacitor.

24. The invention as recited in claim 23, including manually adjustable means to change the discharge rate of the said first capacitor, and wherein both said manually adjustable means are coupled together mechanically.

25. A time proportioning temperature controller for use in a system for maintaining the temperature of a process at a preset level, which system includes transducer means providing a voltage $E_1$ having a magnitude which varies with the process temperature, and a final control element for supplying energy to the process thereby to increase the process temperature, said controller comprising:
(a) means producing a reference voltage $E_2$ having a magnitude corresponding to the said set-point level,
(b) an amplifier having an input resistor,
(c) switch means having a normally OFF position and actuated to an ON position when the voltage across the amplifier input resistor is a finite value of predetermined sign,
(d) a first capacitor,
(e) circuit elements for charging the first capacitor by the difference voltage $E_2-E_1$ when the said switch means is in the OFF position,
(f) circuit elements for discharging the first capacitor through the amplifier input resistor when the said switch means is in the ON position,
(g) means producing a voltage $E_3$ of constant sign and predetermined, fixed amplitude,
(h) a second capacitor,
(i) circuit elements for charging the second capacitor by the voltage $E_3$ when the said switch means is in the ON position,
(j) circuit elements for discharging the second capacitor through the amplifier input resistor when the said switch means is in the OFF position and in a sense opposite to that of the first capacitor,
(k) a third capacitor,
(l) circuit elements for charging the third capacitor in a direction and at a rate corresponding to the rate of change of the difference voltage $E_2-E_1$,
(m) circuit elements for discharging the third capacitor through the amplifier input resistor when the switch means is in the ON position,
(n) manually-adjustable means for simultaneously changing the discharge rate of the first capacitor and the charging rate of the third capacitor,
(o) and means actuating the said control element to supply energy to the process when the said switch means is in the ON position and to cut off the energy supply to the process when the said switch means is in the OFF position.

26. The invention as recited in claim 25, wherein the means actuating the said control element includes means delaying the cut off of energy to the process when the said switch means moves from the ON to the OFF position.

References Cited by the Examiner

UNITED STATES PATENTS

| 1,564,804 | 12/1925 | Warren | 236—68 |
| 2,702,843 | 2/1955 | Taylor. | |
| 2,797,291 | 6/1957 | Davis | 236—68 X |
| 2,823,861 | 2/1958 | Davis | 236—68 |
| 2,838,644 | 6/1958 | Rolfson et al. | |
| 3,036,188 | 5/1962 | Ditto | 219—20.41 |

OTHER REFERENCES

Rolfson, F. B.: "A High Stability Electronic Controller," in Automatic Control, 16 (2), pages 50–54, February 1962.

WILLIAM F. O'DEA, *Acting Primary Examiner.*

ALDEN D. STEWART, *Examiner.*